United States Patent [19]

Murakami et al.

[11] Patent Number: 4,709,209

[45] Date of Patent: Nov. 24, 1987

[54] MAGNETOSTRICTIVE VIBRATION WAVE POSITION DETECTING APPARATUS WITH VARIABLE THRESHOLD DETECTING VALVES

[75] Inventors: Azuma Murakami; Yuji Katsurahira; Yoshinori Taguchi, all of Kuki, Japan

[73] Assignee: Wacom Co., Ltd., Saitama, Japan

[21] Appl. No.: 863,212

[22] Filed: May 14, 1986

[30] Foreign Application Priority Data

May 14, 1985 [JP] Japan .................... 60-102166

[51] Int. Cl.$^4$ .............................................. G01B 7/14
[52] U.S. Cl. ...................................... 324/207; 178/18
[58] Field of Search ............ 324/207, 208; 33/125 W; 178/18, 19; 367/127, 128

[56] References Cited

U.S. PATENT DOCUMENTS 4,634,973 1/1987 Murakami et al. .................. 324/207

FOREIGN PATENT DOCUMENTS 0111918 6/1985 Japan .

Primary Examiner—Gerard R. Strecker
Attorney, Agent, or Firm—Pollock, VandeSande & Priddy

[57] ABSTRACT

A position detecting apparatus has a plurality of magnetostrictive transmission medium elements which are arranged substantially in parallel with one another. A first coil and a second coil are wound around these elements such that signals are exchanged between these coils through the intermediary of the magnetostrictive transmission medium elements. The electric-mechanical coupling coefficient of the magnetostrictive transmission medium elements is locally changed by a magnetism from a position appointing magnetism generator so as to appoint a position on a plane provided by the magnetostrictive transmission medium elements, and the appointed position is detected through detection of a change in the timing of a signal caused by the local change in the above-mentioned coefficient. The position appointing magnetism generator is not connected to any portion of the stationary part of the apparatus. The apparatus is capable of detecting the appointed position at a high resolution, even when the position appointing magnetism generator is spaced apart vertically from the position detecting region. This apparatus is usable also for a moving object, with the position appointing magnetism generator affixed to the moving object.

3 Claims, 20 Drawing Figures

PRIOR ART

PRIOR ART

F I G. 11
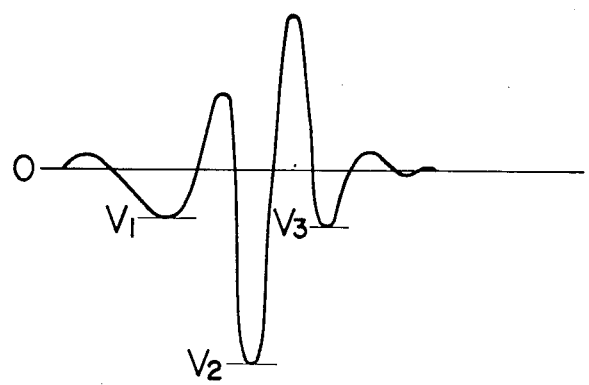
F I G. 12
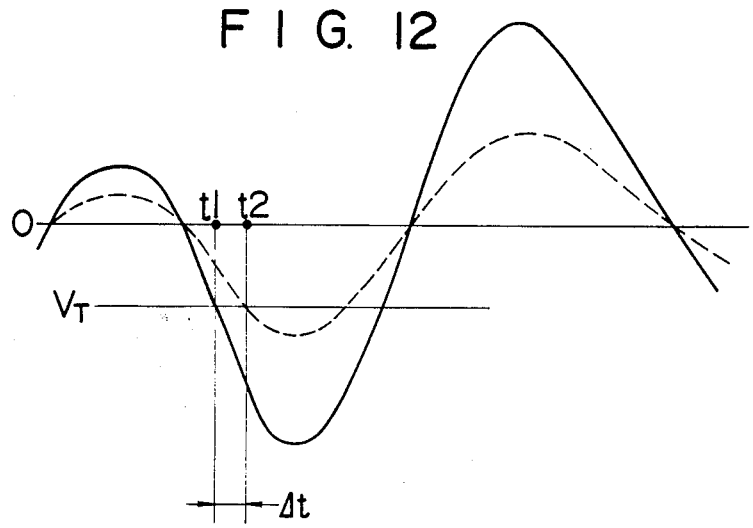

MAGNETOSTRICTIVE VIBRATION WAVE POSITION DETECTING APPARATUS WITH VARIABLE THRESHOLD DETECTING VALVES

BACKGROUND OF THE INVENTION

1. Field of the Invention

The present invention relates to an apparatus for detecting a position which is appointed by a position appointing magnetism generator. More particularly, the invention is concerned with an apparatus for detecting a position which is appointed by a position appointing magnetism generator along the length of a magnetostrictive transmission medium, by making an effective use of the magnetostrictive vibration wave which is propagated through the magnetostrictive transmission medium.

2. Description of the Prior Art

The present applicant has already proposed a position detecting apparatus of this kind as, for example, in Japanese Patent Application No. 220071/1983. In this proposed apparatus, a momentary change in the magnetic field is given by a position appointing magnetism generator so as to cause a magnetostrictive vibration wave in a magnetostrictive transmission medium, and the time from the moment at which the magnetostrictive vibration wave is generated until the moment at which the wave is detected by a detection coil on one end of the magnetostrictive transmission medium is measured. The position appointed by the position appointing magnetism generator is detected by processing the measured time by a suitable processing device. This position detecting apparatus will be explained in more detail. FIG. 1 schematically shows the construction of an X-direction position detecting section of the position detecting apparatus proposed in the above-mentioned Japanese Patent Application. The apparatus has magnetostrictive transmission medium elements 1a to 1d made of a suitable material having magnetostrictive effect. These magnetostrictive transmission medium elements 1a to 1d are arranged substantially in parallel with one another in an X-direction. Any ferromagnetic material can be satisfactorily usable as the material of the magnetostrictive transmission medium elements 1a to 1d. However, materials having high degrees of magnetostrictive effect, e.g., amorphous alloys rich in iron, are preferably used in order to attain strong magnetostrictive vibration waves. It is also preferred that the material of the magnetostrictive transmission medium elements 1a to 1d has a small coercive force so that the elements may not easily be magnetized when approached by a magnet. Examples of the amorphous alloys mentioned above are $Fe_{67}Co_{18}B_{14}Si_1$ (atomic %) and $Fe_{81}B_{13.5}Si_{3.5}C_2$ (atomic %). Each of the magnetostrictive transmission medium elements 1a to 1d is an elongated member preferably having a rectangular or a circular cross-section. Thus, each element preferably has the form of an elongated thin web or the form of a line with a circular cross-section. When the elongated web-like form is adopted, the element is easy to produce and exhibits superior characteristics when it has a width of several millimeters and a thickness ranging between several micrometers and several tens of micrometers. Amorphous alloys can be produced in the form of a thin ribbon of 20 to 50 μm thick by an ordinary production technique. Thus, the magnetostrictive transmission medium of the invention can easily be obtained by cutting the thus obtained ribbon in a suitable length. For information, a preferred embodiment of the invention which will be explained later employs magnetostrictive transmission medium elements each being 2 mm in width and 0.02 mm in thickness and made of an alloy defined as $Fe_{81}B_{13.5}Si_{3.5}C_2$ (atomic %).

The apparatus also has a first X-direction coil commonly wound on one end of each of the magnetostrictive transmission medium elements 1a to 1d. In the illustrated case, the first X-direction coil 2 makes two turns around one end of the magnetostrictive transmission medium elements 1a to 1d, but the number of turns may be one or, alternatively, three or more. The first X-direction coil 2 is intended for causing a momentary change in the magnetic field in the direction perpendicular to the plane of this coil, so as to generate a magnetostrictive vibration wave at the end of each magnetostrictive transmission medium element surrounded by the first X-direction coil 2. To this end, the coil 2 has terminals 2a and 2b which are connected, respectively, to a plus (+) terminal and a minus (−) terminal of a pulse current generator 3 capable of producing a pulse current large enough to cause a magnetostrictive vibration wave.

The apparatus also has biasing magnetic members 4a to 4d which are adapted to apply biasing magnetic fields to the ends of the magnetostrictive transmission medium elements 1a to 1d surrounded by the first X-direction coil 2, in the direction parallel to the axes of the magnetostrictive transmission mediums 1a to 1d. The application of such a biasing magnetic field permits the generation of a large magnetostrictive vibration wave with a small electric current. More specifically, as shown in FIG. 2, the electric-mechanical coupling coefficient of the magnetostrictive transmission medium elements is maximized at a certain level of biasing magnetic field. It is, therefore, possible to efficiently produce the magnetostrictive vibration wave by applying this level of biasing magnetic field. The biasing magnetic members 4a and 4c have opposite polarity to that of the biasing magnetic members 4b and 4d for a reason which will be explained later.

Referring now to FIG. 1, the apparatus further has coils 5a to 5d which are wound around respective magnetostrictive transmission medium elements 1a to 1d over substantial lengths of the latter. These coils 5a to 5d are intended to detect the voltage induced by a magnetostrictive vibration wave which is being propagated through respective magnetostrictive transmission medium elements 1a to 1d. The area covered by the coils 5a to 5d is the area where the appointed position is detectable. The pitch of each of the coils 5a to 5d is preferably small, in order to obtain a greater induced electromotive force. In the illustrated case, the pitch is 7 turns/cm as a mean.

These coils 5a to 5d have an identical winding direction, i.e., counterclockwise direction. Connections are made between the terminal ends of the coils 5a and 5b, between the starting ends of the coils 5b and 5c, and between the terminal ends of the coils 5c and 5d. The starting ends of the coils 5a and 5d are connected to the input terminals of the X-direction input terminals of a processor 6. Thus, in the illustrated apparatus, the coils 5a to 5d are connected in series in such a manner that adjacent two coils exhibit reverse polarities. The coils 5a to 5d thus connected in series constitute a second X-direction coil 5.

A reference numeral 7 denotes a position appointing magnetism generator which is in this case a bar magnet having a diameter of 3 mm and a length of 50 mm.

The arrangement shown in FIG. 1 is intended for the detection of the position appointed by the bar magnet 7 in the X-direction. A reference numeral 8 denotes a transmitter for transmitting a supersonic signal for informing the processor of the timing of commencement of the measurement. A reference numeral 9 designates a receiver for receiving the supersonic signal. In this apparatus, a ceramic microphone servable both as a transmitter and a receiver is used as the transmitter 8 and the receiver 9. An example of the manner of use of the transmitter 8 and the receiver 9 will be explained later.

Referring now to FIG. 1, it is assumed here that the position appointing bar magnet 7 is positioned with its N pole directed downwardly at a point above the magnetostrictive transmission medium 1a which is spaced by a distance "l" from the center of the first X-direction coil 2 as measured in the X-direction, so as to impart a magnetism of a level large enough to cause an appreciable increase in the electric-mechanical coupling coefficient to a portion of the magnetostrictive transmission medium 1a immediately under the bar magnet 7.

As a pulse current is applied from the X-direction pulse generator 3 to the first X-direction coil 2, a momentary change in the magnetic field is caused by the first X-direction coil 2 so that the magnetostrictive vibration wave is generated in the portion of each of the magnetostrictive transmission medium elements 1a to 1d surrounded by the first X-direction coil 2. The magnetostrictive vibration wave then propagates through each of the magnetostrictive transmission medium elements 1a to 1d along the length thereof at a velocity peculiar to the material of the magnetostrictive transmission medium elements 1a to 1d. The propagation velocity is about 5000 m/sec in this case. The conversion of the mechanical energy of the vibration into magnetic energy is conducted at each moment at the position along the magnetostrictive transmission medium elements where the vibration waves exist, so as to induce an induced electromotive force in the second X-direction coil 5.

FIG. 3 shows an example of the change in the electromotive force induced in the second X-direction coil 5 in relation to time, with t=0 representing the moment at which the pulse current is supplied to the second X-direction coil 2.

As will be seen from this Figure, the amplitude of the induced electromotive force exhibits two appreciable peaks: one at the moment immediately after the moment t=0 and the other at a moment which is $t_1$ to $t_2$ seconds after the moment t=0. The first peak is attributable to a mutual electromagnetic induction between the first X-direction coil 2 and the second X-direction coil 5, while the second peak is attributable to the fact that the magnetostrictive vibration wave generated in the portion surrounded by the X-direction first coil 2 and propagated through the magnetostrictive transmission medium elements has reached the position immediately under the position appointing bar magnet 7, where the electric-mechanical coupling coefficient is maximized by the magnetism given by the bar magnet 7. It will be understood by those skilled in the art that, when the position appointing bar magnet 7 is moved along the length of the magnetostrictive transmission medium element, i.e., in the X-direction, the position of the second peak of the amplitude of the induced electromotive force also is moved along the time axis. It is, therefore, possible to compute the distance "l", i.e., the position appointed by the position appointing bar magnet 7 in the X-direction, by measuring the time between the moment $t_0$ and the moment $t_1-t_2$ at which the above-mentioned second peak appears. The calculation of the propagation time for computing the position may be conducted, for example, on the basis of a moment $t_3$ at which the amplitude of the induced electromotive force has come down below a predetermined threshold level $-E_1$ or a moment $t_4$ at which the same has become greater than another threshold level $E_1$ or even on the basis of the zero-cross point $t_5$.

Referring back to FIG. 1, it will be clear to those skilled in the art that similar curves of the induced electromotive force as those shown in FIG. 3 are obtained when the N pole of the position appointing bar magnet 7 is positioned on any of the other medium elements 1b to 1d by a traversing movement of the position appointing bar magnet 7. This is because the coils 5a, 5c and the coils 5b, 5d have reverse polarities while the biasing magnetic members 4a to 4b have alternating polarities as illustrated. This in turn permits the output of the induced electromotive force in a constant polarity, thus affording a high precision of the detection of position. The fact that the coils 5a, 5c and the coils 5b, 5d have reverse polarities reduces the first peak of the induced electromotive force appearing immediately after the moment $t_0$, which is the voltage induced in the second X-direction coil 2 by the first X-direction coil 2, because the peaks appearing in the coils 5a, 5c, and 5b, 5d of the reverse polarities negate each other. This permits the distance between the first X-direction coil 2 and the second X-direction coil 5 to be reduced, which in turn affords a greater area of position detection. This effect is generally obtainable when the coils of the second X-direction coil on about one half of all the magnetostrictive transmission medium elements have the polarity reverse to that of the coils wound on the other half of the magnetostrictive transmission medium elements. It has been confirmed through experiments that, when the position appointing bar magnet 7 is above the magnetostrictive transmission medium element 1a in the arrangement shown in FIG. 1, the polarity of the induced electromotive force is reversed when the polarity of the position appointing bar magnet 7 is reversed, when the polarity of the biasing magnetic member 4a is reversed, when the winding direction of the first or the second X-direction coil 2 or 5a is reversed or when the polarity of connection of the first X-direction coil 2 or the coil 5a is reversed.

This means that, when the winding directions of the coils 5b and 5d are reversed, the output of the induced electromotive force can be obtained always in the constant polarity, provided that the polarity of the biasing magnetic members 4b and 4d is reversed. Such an arrangement, however, will suffer from a disadvantage in that the level of the electromotive force induced in the second X-direction coil 5 by the first X-direction coil 2 becomes impractically large. The arrangement may also be such that the coils 5a to 5d are connected in parallel, although such an arrangement cannot produce a large level of induced electromotive force.

FIG. 4 shows the construction of a Y-direction position detecting section which is adapted for use in combination with the X-direction position detecting section shown in FIG. 1. The Y-direction position detecting section includes magnetostrictive transmission medium elements 10a to 10d arranged substantially in parallel with one another so as to extend in a Y-direction, a first Y-direction coil 11 which is wound commonly around one end of the magnetostrictive transmission medium elements 10a to 10d, a Y-direction pulse current generator 15 adapted to apply a pulse current to the first Y-direction coil 11 so as to cause magnetostrictive vibration waves in all the magnetostrictive transmission medium elements 10a to 10d simultaneously, biasing magnetic members 12a to 12d for imparting biasing magnetic fields to the end portions of the magnetostrictive transmission medium elements surrounded by the first Y-direction coil 11, and coils 13a to 13d wound around respective magnetostrictive transmission medium elements 10a to 10d over substantial lengths of the latter. The coils 13a to 13d have an identical winding direction, and connections are made between the terminal ends of the coils 13a and 13b, between the starting ends of the coils 13b and 13c and between the terminal ends of the coils 13c and 13d. The starting ends of the coils 13a and 13d are connected to Y-direction input terminals of the processor 6. Thus, the coils 13a to 13d are connected in series such that the adjacent coils exhibit reverse polarities, whereby a second Y-direction coil 13 is formed by these coils 13a to 13d, as in the case of the X-direction second coil 5.

As will be explained later, the magnetostrictive transmission medium elements 10a to 10d, together with the first and second Y-direction coils 11 and 13 wound thereon as shown in FIG. 4, are superposed to the magnetostrictive transmission medium elements 1a to 1d on which the first and the second X-direction coils 2 and 5 are wound, as closely as possible to the elements 1a to 1d. The thus constructed Y-direction position detecting section performs the detection of position in the Y-direction, in the same manner as that explained before in connection with the X-direction position detecting section. The construction and operation of other portions are materially identical to those in FIG. 1, so that a detailed description thereof will not be needed.

FIG. 5 is a plan view of the position detecting section of the position detecting apparatus, while FIG. 6 is a sectional view taken along the line A—A' of FIG. 5. As will be seen from these Figures, the first X-direction coil 5 receiving the magnetostrictive transmission medium elements 1a to 1d is received in a recess formed in the inner bottom surface of a housing 30, and is overlain by the second Y-direction coil 13 which receives the magnetostrictive transmission medium elements 10a to 10d. These coils are bonded together as necessitated by, for example, an adhesive.

The first X-direction coil 2 and the first Y-direction coil 11 are grounded at one end and connected at their other end to the external X-direction pulse current generator 3 and the Y-direction pulse current generator 15. The second X-direction coil 5 and the second Y-direction coil 13 are grounded at one end, while other ends thereof are led externally so as to be connected to the processor 6. The biasing magnetic members 4 and 12 are fixed to the inner bottom surface of the housing 30 so as to face the ends of corresponding magnetostrictive transmission medium elements, although they may be disposed at the upper side, lower side or at a lateral side of the corresponding magnetostrictive transmission medium elements. The housing 30 is covered by a cover 31 on which the position appointing bar magnet 7 is moved.

FIG. 7 is a circuit diagram of a circuit which serves as the X-direction pulse current generator 3 and the Y-direction pulse current generator 15. This circuit has a capacitor 50 which is charged by a D.C. source 53 through resistors 51, 52, and a thyristor 54 which is connected in parallel with a series connection of the capacitor 50 and the resistor 52. When the thyristor 54 is turned on, the capacitor 50 discharges through the thyristor 54 and the resistor 52 so that a voltage is produced across the resistor 52 and is supplied to the first coil 2. The thyristor 54 is adapted to be turned on by a trigger pulse which is delivered by the processor 6 shown in FIG. 1 to the gate of the thyristor 54.

FIG. 8 is a block diagram of an essential portion of an example of the processor 6. The change-over switches and 61 are operatively connected to each other and are adapted for conducting a switching between a manual mode and an automatic mode of the position detecting operation. Another change-over switch 62 is provided for effecting a switching between the position detection in the X-direction and the position detection in the Y-direction, when the detection of position is being conducted in the manual mode. A trigger switch 63 is adapted for appointing the measuring position during position detection in the manual mode. The operation in each operation mode of the processor shown in FIG. 8 will be explained hereinbelow.

Manual Mode (Position Detection in X-direction)

The change-over switch 62 is turned to the grounding side so that an analog multiplexer 64 is connected to the X-input side. At the same time, an AND circuit 65 is closed, while another AND circuit 66 is opened by the output from the inverter 67, whereby the apparatus gets ready for the position detection in X-direction. Then, a supersonic signal representing the commencement of the measurement, e.g., a pulse signal of a predetermined supersonic frequency, is transmitted from the transmitter 8. As this signal is received by the receiver 9, the continuous pulse signal is amplified by the amplifier 68 and, after a shaping by a wave shaping circuit 69, delivered to an output buffer circuit 70. A computer 71 acknowledges the commencement of the measurement upon reading the pulse signal from the output buffer circuit 70. In the manual mode of operation, however, no signal is delivered to an input buffer circuit 72.

As the trigger switch 63 is turned on, a trigger pulse as shown in FIG. 9A is generated by a trigger pulse generator 73. This trigger pulse activates a one-shot multivibrator 74 which in turn produces a pulse (pulse width about 10 μsec), as shown in FIG. 9B which in turn clears a counter 75 while resetting a an RS flip-flop 76. The $\overline{Q}$ output from the RS flip-flop 76 is received as a gate signal by the AND circuit 77. Therefore, when the RS flip-flop 76 is reset, the counter 75 commences the counting of the clock pulses of a frequency of, for example, 100 MHz produced by a clock oscillator 78. The output from the one-shot multivibrator 74 is inputted as a trigger pulse to the X-direction pulse current generator 3 through an AND circuit 66, so that a pulse current is supplied to the first X-direction coil 2.

The electromotive force induced in the second X-direction coil 5 by the magnetostrictive vibration wave is delivered through the analog multiplexer 64 to an amplifier 79 so as to be amplified by the latter. The amplified output from the amplifier 79 is then inputted to a comparator 80 which serves as a threshold value setting device. The signal representing the electromotive force induced by the magnetostrictive vibration wave, received by the comparator 80, is represented by a in FIG. 9C, while a threshold voltage represented by b in the same Figure is delivered to the + terminal of the comparator 80 by a D.C. power supply $E_1$. The comparator 80 produces an output "1" as shown in FIG. 9D, as long as the output from the analog multiplexer 64 is greater than the threshold value b, i.e., when the positive polarity portion of the induced electromotive force is being detected.

The arrangement is such that the output from the comparator 80 resets RS flip-flop 76, so that the $\overline{Q}$ output thereof closes the AND circuit 77, whereby the counter 75 stops the counting operation. Thus, the counting by the counter 75 is stopped when the voltage induced by the magnetostrictive vibration wave appears in the X-direction second coil 5. It is, therefore, possible to know the time between the moment at which the trigger pulse is issued and the moment at which the induced voltage is detected, in terms of the digital value counted by the counter 75. Considering that the magnetostrictive vibration wave propagates through the magnetostrictive transmission medium elements at a substantially constant velocity of 5000 m, the thus measured time length directly indicates the distance between the first X-direction coil 2 and the position appointing magnetism generator 7 in the X-direction. The thus obtained X-direction position data in the form of digital value is inputted through the output buffer circuit 70 to a digital display 81 where it is displayed digitally or, alternatively, inputted to and processed by the computer 71.

(Position Detection in Y-direction)

The change-over switch 62 is turned to $+V_D$ side, so that the analog multiplexer 64 is connected to the Y-input side, i.e., for the connection to the second Y-direction coil 13. Meanwhile, the AND circuit 65 is opened while the AND circuit 66 is closed, so that the Y-direction pulse current generator 15 enables the position detection in the Y-direction. The detection of position in the Y-direction is then conducted in the same manner as that in the position detection in X-direction.

Automatic Mode of Position Detection

In the automatic mode of the position detecting operation, the change-over switches 60 and 61 have been turned to AUTO, so that the computer 71 can read the output from the wave shaping device 69 through the output buffer circuit 70. The computer therefore can deliver a starting pulse to the one-shot multivibrator 74 through the input buffer circuit 72, and can control the state of the AND circuits 65 and 66, as well as the state of clearing of the counter 75.

FIG. 10 is a flow chart showing an example of the process performed by the computer 71 during the position detection in the automatic mode.

Referring to this Figure, in Step S1, the signal representing the commencement of the measurement is outputted from the wave shaping device 69. In response to this signal, the computer 71 delivers through the input buffer circuit 72 an X-Y change-over instruction output "0" to its peripheral equipment and delivers a trigger pulse to the one-shot multivibrator 74, in Steps S2 and S3. In a next step S4, the computer 71 observes the $\overline{Q}$ output of the RS flip-flop 76 and, upon detection of the $\overline{Q}$ output having come down to "0" in Step S5, reads the content of the counter 75 through the output buffer circuit 70. The computer 71 then stores the X-direction position in a memory which is not shown. Then, in a next step S6, the X-Y change-over instruction output is changed to "1" for enabling the position detection in the Y-direction. In Step S7, the computer 71 delivers a trigger pulse to the one-shot multivibrator 74 and, in Step S8, observes the $\overline{Q}$ output of the RS flip-flop 76. In Step S9, the computer 71 reads the content of the counter 75, upon detection of the $\overline{Q}$ output having been changed to "0".

If the issue of the signal indicating the commencement of the measurement from the wave shaping device 69 is maintained, the position detection in the X- and Y-directions is conducted consecutively, in the same manner as that explained hereinbefore. The arrangement may be such that, when the same value is read in the X- or Y-direction measurement in the successive position detection cycles, the operation for the storage of the value in the current position detection cycle is omitted.

This position detecting apparatus, however, suffers from the following disadvantages.

Namely, since the position appointed by the position appointing magnetism generator is detected in terms of the time or moment at which the level of the detection signal has exceeded a predetermined threshold level b, the position detection may failed when the peak voltage of the induced electromotive force is lower than the threshold level b. It is to be pointed out also that the threshold level b may be exceeded by the detection output level at other moments than the moment at which the magnetostrictive vibration wave passes the position where the position appointing magnet is placed. The counting of the clock pulses is stopped whenever the predetermined threshold level is exceeded, so that the position is detected wrongly.

The risk of occurrence of such position detection failure or erroneous detection can be attributed to the following reasons.

Firstly, it is to be pointed out that the level of the detection output voltage is progressively decreased towards the end of the magnetostrictive transmission medium element remote from the exciting end, due to attenuation of the magnetostrictive vibration wave propagating through the magnetostrictive transmission medium element. Secondly, the level of the detection output voltage is smaller in both end regions than in the central region, even though the distance from the exciting portion is unchanged. Thirdly, although it is preferred that the waveform of the detection output voltage as shown in FIG. 3 has no peak other than that corresponding to the position of the position appointing magnet, the waveform actually contains oscillation of a level on the order of 5% or so of the detection output voltage. The level of the oscillation is determined by the characteristics of the amorphous alloy used as the material and, in some cases, reaches 10 to 30% of the output voltage level. This unnecessary oscillation is attributable to the characteristics of the apparatus itself. Furthermore, distortion of the waveform of the detection output voltage is also caused by other factors such as external noises incurred by the electromagnetic induction or when the apparatus is set at a place where the magnetic field is not uniform. The components of detection output voltage produced by factors other than the position appointing magnet will be generally referred to as "noise" hereinafter. Fourthly, the position detection may be failed or conducted wrongly when the threshold level has not been selected adequately. Namely, the waveform of the detection output voltage has a plurality of peak points as shown in FIG. 11, and the highest S/N ratio is obtained when the detection is conducted on the basis of the peak $V_2$ having the highest level. In order to discriminate this peak $V_2$ from another peak $V_1$, it is essential that the threshold level $V_T$ is determined to meet the condition of $V_1 < V_T < V_2$. Namely, the detection of position will fail if the threshold level $V_T$ is determined to be lower than the peak level $V_2$. On the other hand, any threshold value which is below the voltage $V_1$ will cause a wrong position detection.

Thus, the position detection will be done wrongly if the waveform exceeds the threshold level at a wrong position due to the superposition of the noise to the output voltage. In addition, the level of the waveform of the detection output voltage becomes small in the peripheral region of the effective area. If the peak value obtained from such peripheral region is smaller than the threshold level, the detection cannot be conducted at all.

Another problem encountered by the position detection appartus described hereinbefore is that the precision of reading is impaired due to a change in the level of the detection output waveform. The waveform shown by a full line in FIG. 12 is the one which is obtained when the detection output voltage level is comparatively high. In this case, the counting of the clock pulses is stopped wrongly at a moment $t_1$ at which the threshold level $V_T$ is exceeded. On the other hand, the broken-line curve in FIG. 12 shows the waveform of the detection output voltage as obtained when the detection voltage is comparatively low. In this case, the counting of the clock pulses is stopped at a moment $t_2$ at which the threshold value $V_T$ is exceeded. The presence of such a difference in the detection output voltage level within the effective area impairs the precision of the position detection, undesirably causing an offset of measurement by an amount corresponding to the time differential $\Delta T$ between the moment $t_1$ and $t_2$.

SUMMARY OF THE INVENTION

Accordingly, an object of the invention is to provide a position detecting apparatus which is capable of overcoming the above-described problems of the prior art.

To this end, according to the invention, there is provided a position detecting apparatus having a plurality of magnetostrictive transmission medium elements arranged substantially in parallel with one another. A first coil is wound commonly around one end of the magnetostrictive transmission medium elements, while a second coil wound over the substantial region of the magnetostrictive transmission medium elements. A pulse current generator is adapted to apply a pulse current to one of the first and second coils so as to produce magnetostrictive vibration waves in the magnetostrictive transmission medium elements, and a processor is provided for detecting the time from the moment at which the magnetostrictive vibration waves are generated and a moment at which the level of voltage induced in the other of the first and second coils exceeds a predetermined threshold level. A position appointing magnetism generator is also provided and is capable of generating magnetism which locally increases the electric-mechanical coupling coefficient of the magnetostrictive transmission medium elements. The improved apparatus comprises: means for varying the threshold value in accordance with the peak level of the voltage induced in the other of the first and second coils.

With this position detecting apparatus, it is possible to preserve a wider effective area and to reduce the possibility of erroneous position detection attributable to noise. In addition, high precision of position detection is ensured even when the position detection voltage is changed largely by the position appointing magnetism generator. Furthermore, adjustment and inspection of the apparatus are facilitated so that the efficiency of the production of the apparatus is improved advantageously.

It is to be understood also that, even if the level of the induced voltage has come down below one half due to a change in the position of the cursor as the position appointing magnetism generator, the linearity of the position detection is not impaired by such a reduction in the level of the induced voltage.

The apparatus may employ a ring-shaped magnet in some cases and a bar magnet in other cases as the position appointing magnetism generator, so that the apparatus has to be adjusted to an optimum level for the different strengths of the magnetic fields produced by the ring-shaped magnets and the bar-shaped magnets. In the position detecting apparatus of the invention, such adjustment is effected without substantial difficulty and problem.

Other objects, features and advantages of the invention will become clear from the following description of the preferred embodiments when the same is read in conjunction with the accompanying drawings.

BRIEF DESCRIPTION OF THE DRAWINGS

FIG. 11 is a waveform chart showing peaks in the waveform of the detection output voltage;

FIG. 12 is a waveform chart illustrating how the precision of detection of position is affected by a change in the level of the induced voltage;

DESCRIPTION OF THE PREFERRED EMBODIMENT

Figure 13:
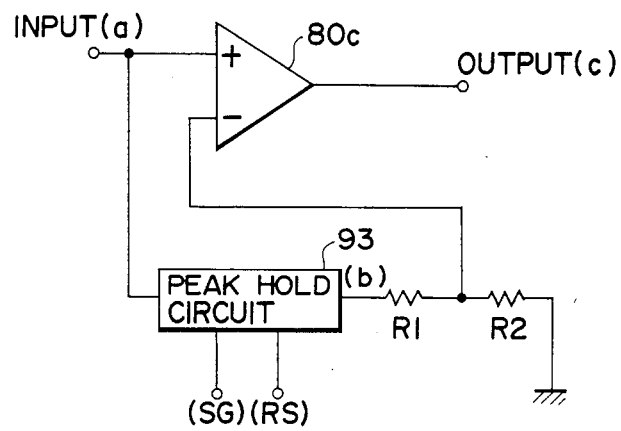
FIG. 13 is a block diagram of an essential portion of a position detecting apparatus in accordance with the invention.

FIG. 13 is a block diagram of an essential portion of a position detecting apparatus embodying the present invention. In FIG. 13, a reference numeral 80C denotes a comparator having a first input terminal adapted for receiving the voltage induced in the second coil 5 or 13, and a second input terminal connected to a junction point between potential dividing resistors $R_1$ and $R_2$. A numeral 93 designates a peak hold circuit which serves as a threshold value setting device. The peak hold circuit 93 produces a threshold voltage which varies according to the above-mentioned induced voltage inputted thereto, and delivers this threshold voltage to the comparator 80C after a potential division by the resistors $R_1$ and $R_2$. The peak hold circuit 93 has two input terminals: namely, an input terminal SG for sample gate pulses and an input terminal RS for the reset pulse.

Figure 1:
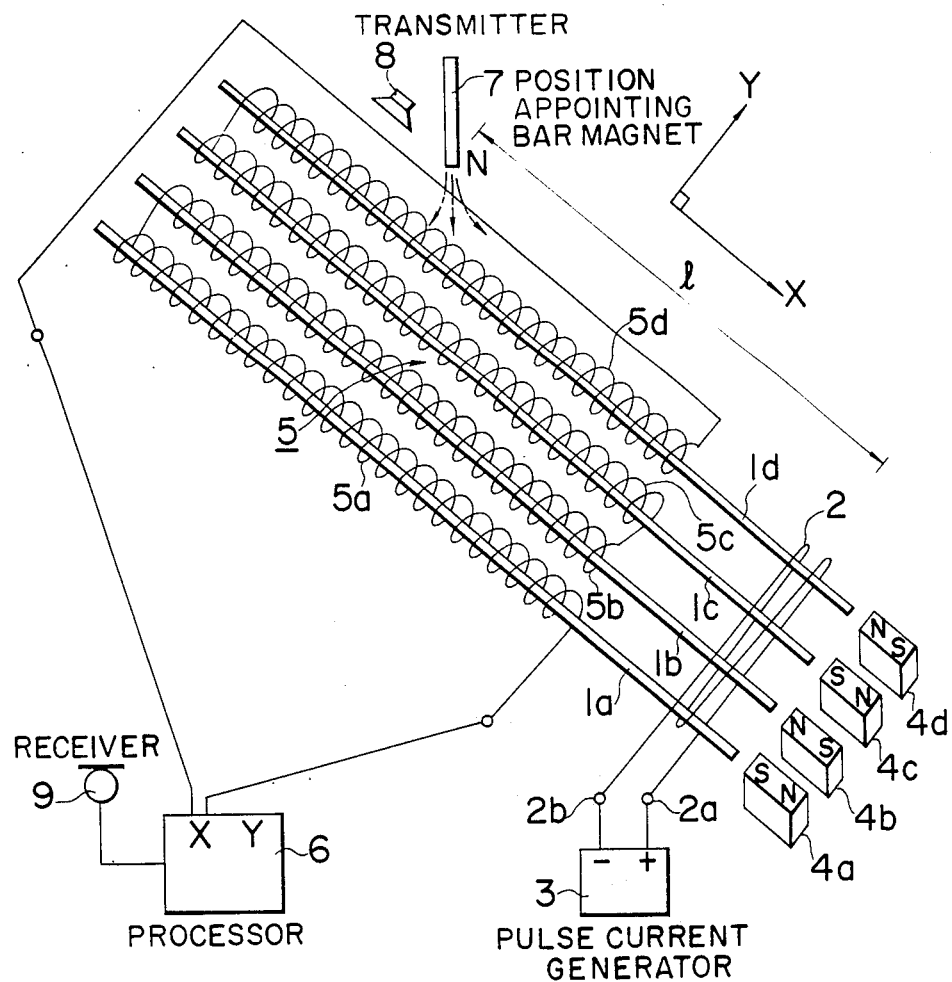
FIG. 1 is a schematic illustration of an X-direction position detecting section in a known position detecting apparatus.
Figure 2:
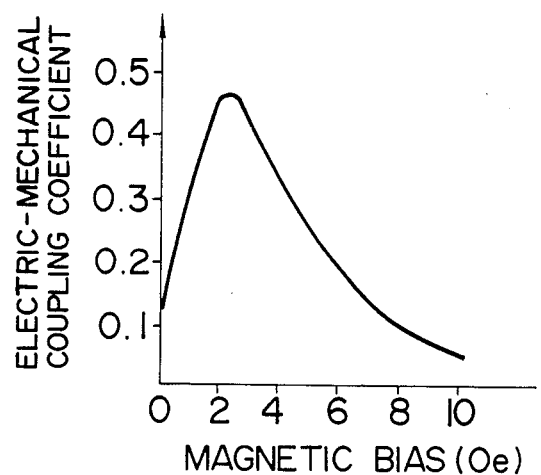
FIG. 2 is a chart illustrating the electric-mechanical coupling coefficient.
Figure 3:
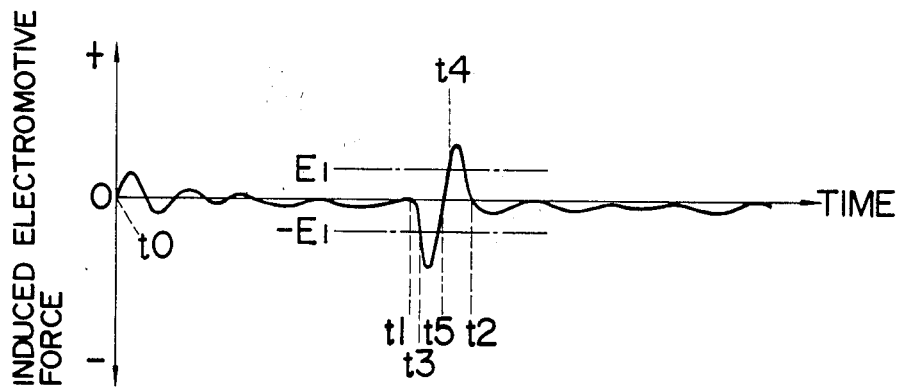
FIG. 3 is a diagram showing an example of the change in the electromotive force induced in a second X-direction coil in relation to time.
Figure 4:
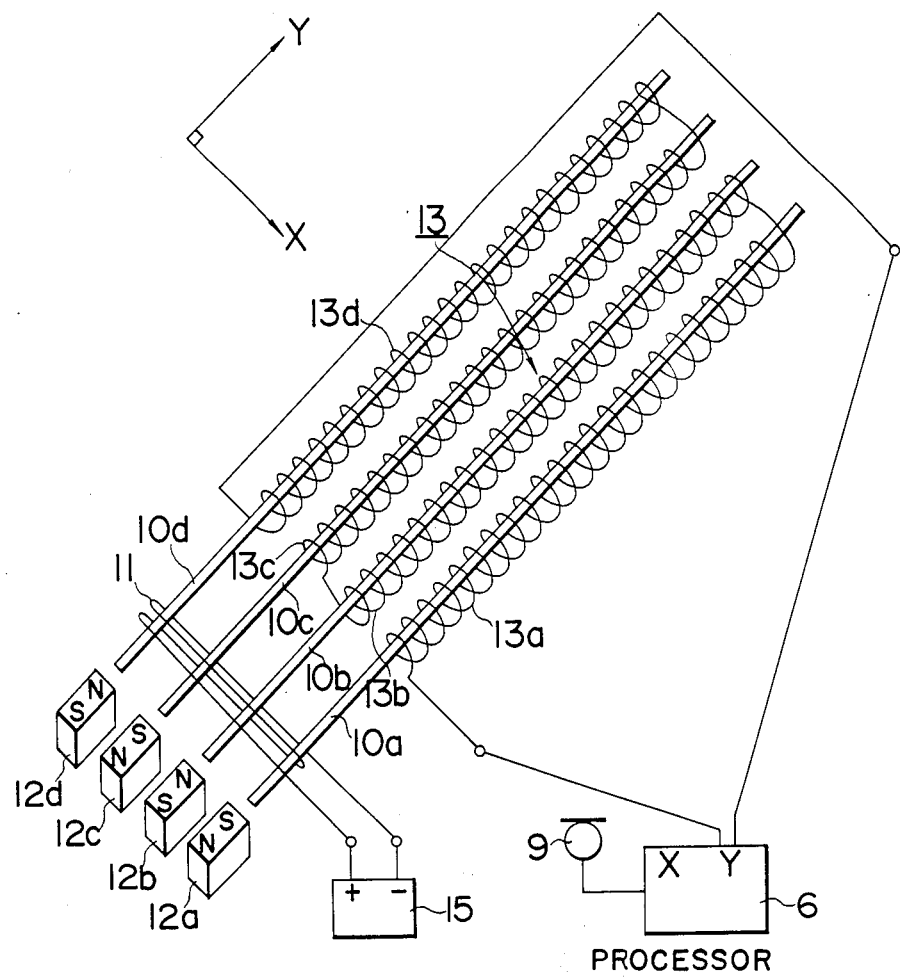
FIG. 4 is a schematic illustration of the construction of a Y-direction position detecting section.
Figure 5:
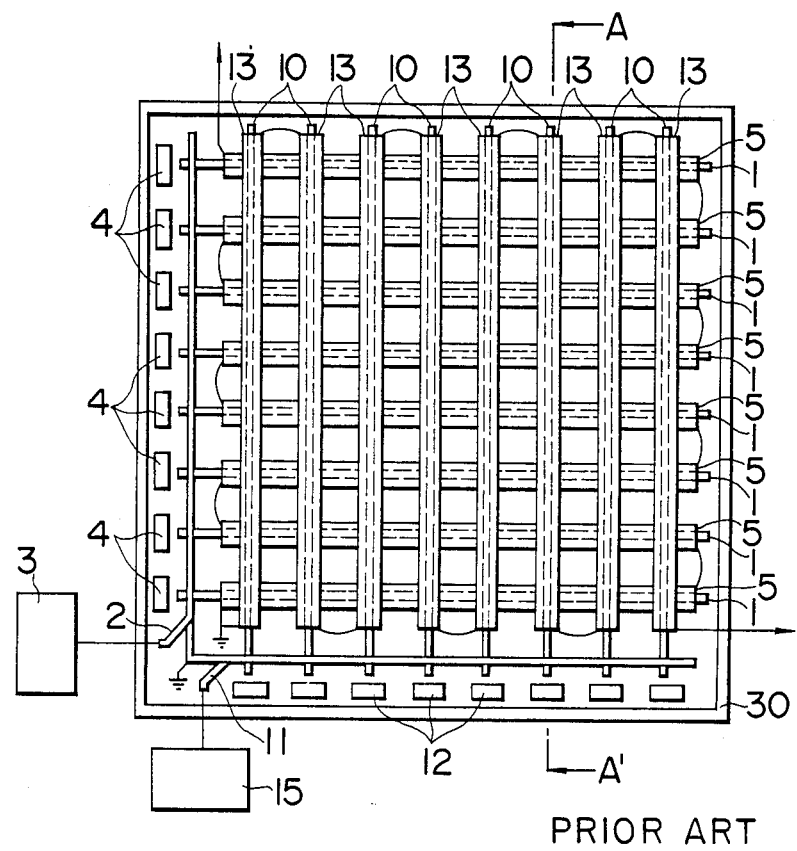
FIG. 5 is a plan view of a position detecting section of the known position detecting apparatus.
Figure 6:
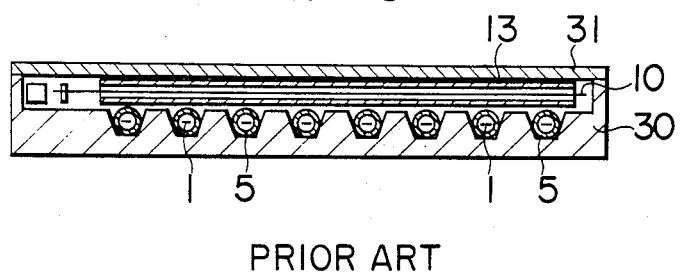
FIG. 6 is a sectional view taken along the line A—A' of FIG. 5.
Figures 7, 9A, 9B, 9D:
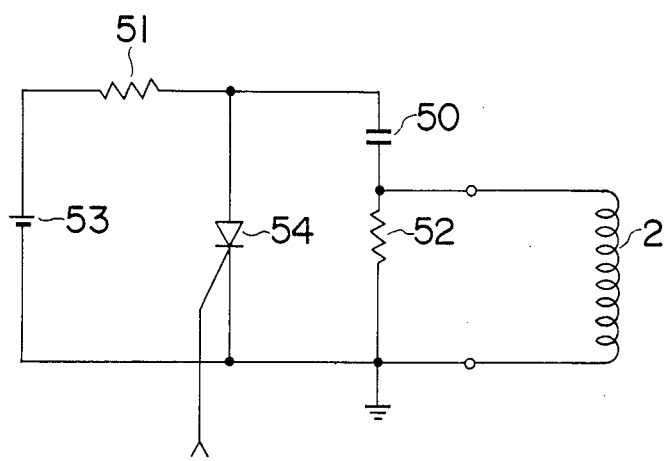
FIG. 7 is an electric circuit diagram of an electric circuit which is usable as an X-direction pulse current generator or a Y-direction pulse current generator.
FIGS. 9A, 9B, 9C and 9D are illustrations of operation of the processor shown in FIG. 8.
Figure 9C:
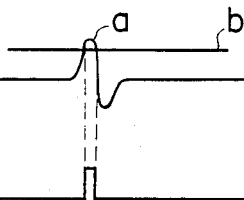
Figure 8:
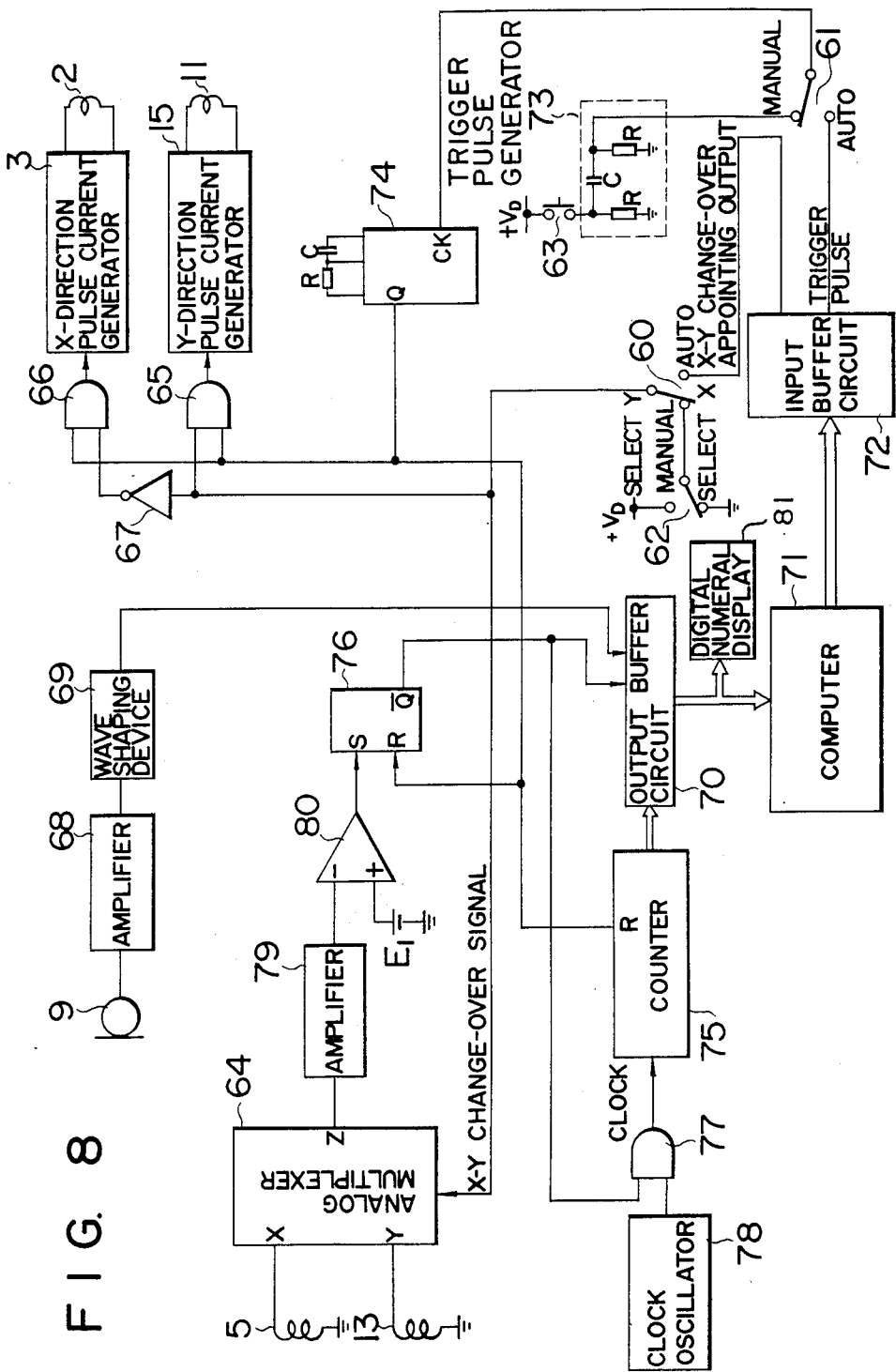
FIG. 8 is a block diagram of an essential portion of a processor.
Figure 10:
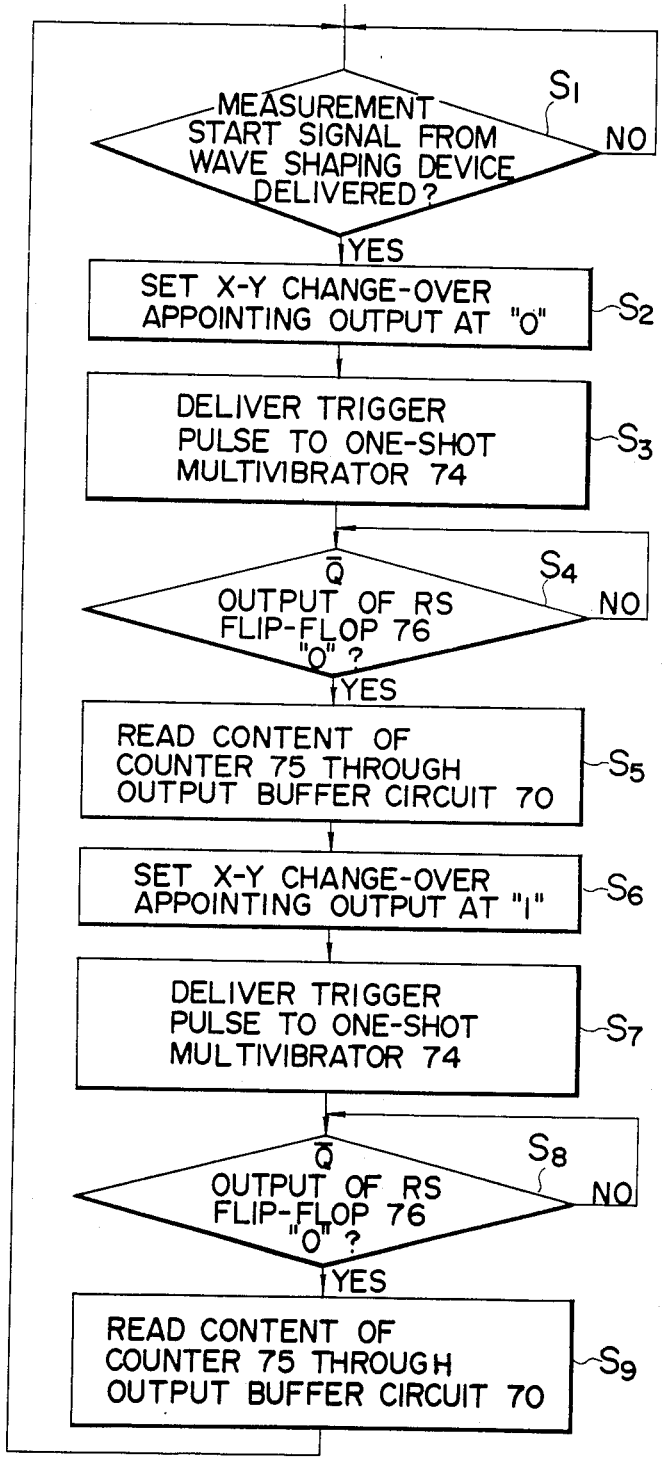
FIG. 10 is a flow chart of an example of the process performed by a computer.
Figure 14:
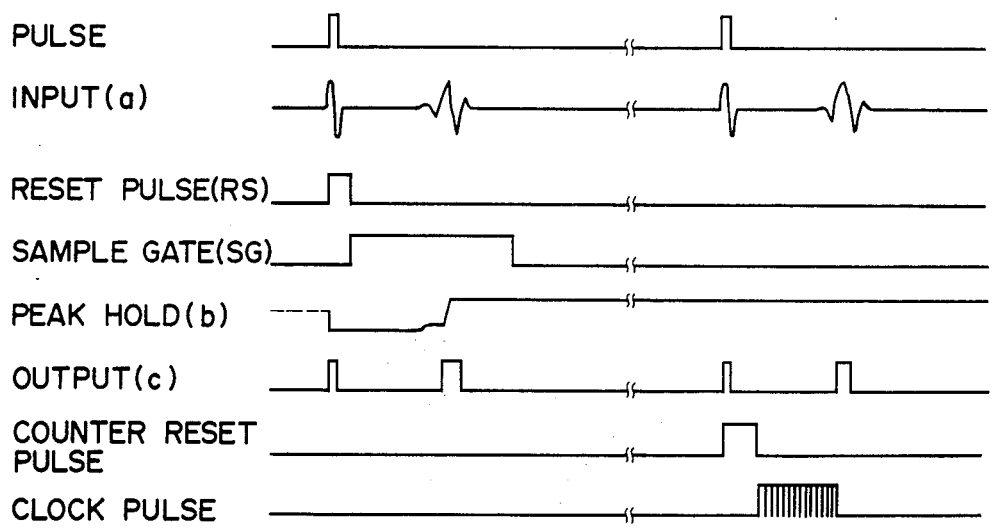
FIG. 14 is a time chart showing timings of various signals in various portions of the circuit shown in FIG. 13.

A description will be made hereinbelow as to the operation of this circuit, with reference to the signal timing chart shown in FIG. 14, the apparatus embodied by FIGS. 1 and 4 and the processor diagram of FIG. 8. When a first pulse is delivered by the pulse current generator 3 (FIGS. 1 or 4), the counter circuit 75 (FIG. 8) does not operate so that the peak hold circuit 93 (FIG. 13) operates so as to hold the peak level of the magnetostrictive vibration wave in the period between successive sample gate pulses. Then, as a second pulse is delivered, the counter 75 operates to count the number of the clock pulses. The counting is stopped whenever the waveform of the detection output voltage has exceeded a predetermined threshold level. The threshold level is determined by the peak value of the detection output voltage waveform obtained after the delivery of the first pulse, i.e., by the output from the peak hold circuit 93 (FIG. 13). Namely, the highest level of the detection output voltage experienced in the interval of sample gate pulses obtained after the delivery of the first pulse is held by the peak hold circuit, and a voltage which is obtained through a potential division by resistors $R_1$ and $R_2$ is inputted to the comparator 80C (FIG. 13) as the comparison voltage. This D.C. voltage is held from the moment at which the waveform obtained in response to the first pulse in the first measurement has reached the peak level until the moment at which the first pulse for the second measurement is issued after the delivery of the second pulse for the measurement. The reset pulse delivered to the peak hold circuit 93 serves to set the peak voltage value held in the peak hold circuit 93 to zero. The reset pulse, sample gate pulse and the counter reset pulse shown in FIG. 14 are obtainable by hardware or software without difficulty.

Thus, the peak value of the induced voltage obtained in response to the first pulse in each measurement is divided by a constant value which is determined by the ratio between the resistance values of the resistors $R_1$ and $R_2$, and the voltage obtained by this division is used as the comparison or the threshold level in the measurement conducted by the second pulse. It will be seen that the detection of the peak value corresponding to the position appointed by the position appointing magnetism generator can be detected even when the level of the peak value is comparatively low.

Figure 15A:
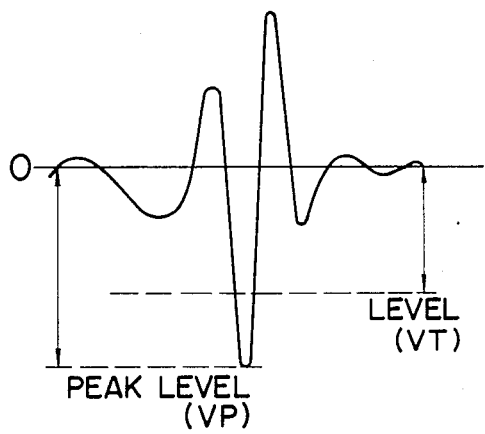
FIGS. 15a and 15b are waveform charts illustrating the relationship between the peak levels of the induced voltages and the set threshold level.
Figure 15B:
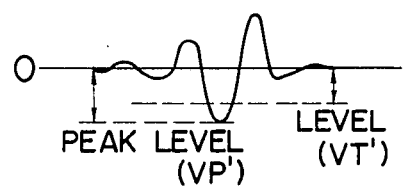

FIGS. 15a and 15b show, respectively, the relationship between the peak level and the threshold level, in a case where the level of the induced voltage is relatively high and a case where the same is relatively low. In these Figures, VP and VP' represent the peak levels of the induced voltage, while VT and VT' represent the threshold levels. These levels meet the following condition:

$$VT/VP = VT'/VP' = R_2/(R_1+R_2)$$

In addition, since the threshold level is varied in accordance with the level of the peak voltage, it is possible to set the threshold at a level near the peak level of the detection output voltage. This remarkably reduces the possibility of erroneous detection due to noise. It is therefore possible to detect the induced voltage with a high accuracy even when the amplitude of the waveform fluctuates largely within the effective area.

In the known apparatus described before, no function is employed for automatically readjusting the threshold level in accordance with the level of the peak value of the detection output voltage. The known apparatus therefore requires much time and labor for the adjustment of the threshold level and for the degree of amplification of the input voltage, which is to be compared with the threshold level.

In contrast, according to the invention, the level of the noise and the amplitude of the detection output voltage are not so critical, and the apparatus of the invention can operate satisfactorily if only the input signal level and the threshold level are adjusted such that they substantially conform with the predetermined values when the position appointing magnetism generator is positioned substantially at the center of the effective area.

Figure 16:
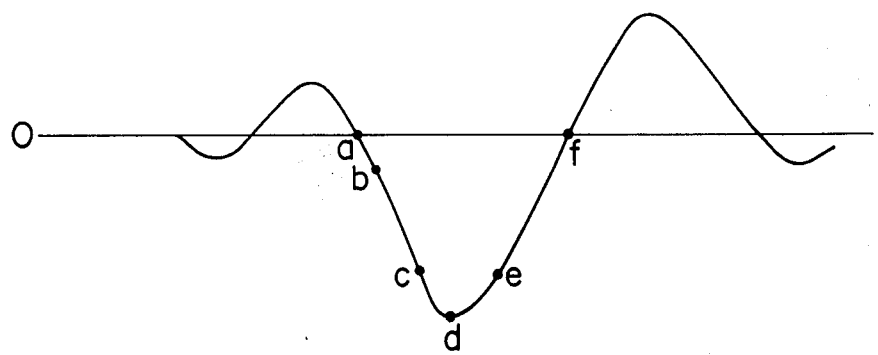
FIG. 16 is an illustration of the points of detection along the waveform of the induced voltage.

The circuit as shown in FIG. 13 can be used as it is if the detection of the position is conducted on the basis of the detection of a point c on the waveform shown in FIG. 16. It will be understood by those skilled in the art, however, that the position detection can be conducted on the basis of the detection of points a, b, d, e or f on the waveform shown in FIG. 16, provided that a suitable detection circuit for detecting such a point is used in combination with the circuit shown in FIG. 13.

Although the invention has been described through specific terms, it is to be understood that the described embodiment is only illustrative and various changes and modifications may be imparted thereto without departing from the scope of the invention which is limited solely by the appended claims.

What is claimed is:

1. A position detecting apparatus comprising:
   a plurality of magnetostrictive transmission medium elements arranged substantially in parallel with one another;
   a first coil wound commonly around one end of said magnetostrictive transmission medium elements;
   a second coil wound over a substantial portion of each of said magnetostrictive transmission medium elements;
   a pulse current generator for applying a pulse current to either one of said first or second coils so as to produce magnetostrictive vibration waves in said magnetostrictive transmission medium elements;
   a processor for detecting the time from the moment at which said magnetostrictive vibration waves are generated and a moment at which the level of voltage induced in the other of said first and second coils exceeds a predetermined threshold level;

a position appointing magnetism generator superposed over a position of an area of the magnetostrictive transmission medium elements wound over by the other of said first and second coils for generating magnetism which locally increases the electric-mechanical coupling coefficient of said magnetostrictive transmission medium elements proximate to said position; and means electrically cooperating with said processor for varying said threshold level in accordance with the peak level of said voltage induced in said the other of said first and second coils.

2. A position detecting apparatus according to claim 1, wherein said magnetostrictive transmission medium elements are made of an amorphous alloy.

3. A position detecting apparatus according to claim 1, further comprising biasing magnetic members adapted for applying biasing magnetic fields to respective magnetostrictive transmission medium elements in the direction parallel to the axes of said magnetostrictive transmission medium elements.

* * * * *

UNITED STATES PATENT AND TRADEMARK OFFICE
CERTIFICATE OF CORRECTION

PATENT NO. :   4,709,209
DATED      :   November 24, 1987
INVENTOR(S):   Azuma Murakami, et al.

It is certified that error appears in the above-identified patent and that said Letters Patent is hereby corrected as shown below:

In the Title, line 4, change "VALVES" to --VALUES--.

Column 1, line 3, change "VALVES" to --VALUES--.

Column 4, line 31, change "2" (first occurrence) to --5--.

Column 6, line 15, after "switches" insert --60--.

Column 6, line 52, delete "a" (second occurrence).

Column 8, line 25, change "failed" to --fail--.

Column 9, line 21, change "appartus" to --apparatus--.

Signed and Sealed this

Eighteenth Day of April, 1989

*Attest:*

DONALD J. QUIGG

*Attesting Officer*   *Commissioner of Patents and Trademarks*